United States Patent
Therkildsen (12) United States Patent (10) Patent No.: US 10,094,357 B2
(45) Date of Patent: Oct. 9, 2018

(54) NACELLE FOR A WIND TURBINE GENERATOR INCLUDING LIFTING APPARATUS

(71) Applicant: Vestas Wind Systems A/S, Aarhus N. (DK)

(72) Inventor: Claus Hald Therkildsen, Ryomgård (DK)

(73) Assignee: Vestas Wind Systems A/S, Aarhus N. (DK)

( * ) Notice: Subject to any disclaimer, the term of this patent is extended or adjusted under 35 U.S.C. 154(b) by 214 days.

(21) Appl. No.: 15/039,713

(22) PCT Filed: Nov. 24, 2014

(86) PCT No.: PCT/DK2014/050397
§ 371 (c)(1),
(2) Date: May 26, 2016

(87) PCT Pub. No.: WO2015/078475
PCT Pub. Date: Jun. 4, 2015

(65) Prior Publication Data
US 2017/0022966 A1 Jan. 26, 2017

(30) Foreign Application Priority Data
Nov. 27, 2013 (DK) .................................. 2013 70721

(51) Int. Cl.
*F03D 80/80* (2016.01)
*B66C 13/16* (2006.01)
(Continued)

(52) U.S. Cl.
CPC .............. *F03D 1/003* (2013.01); *B66C 13/16* (2013.01); *B66C 23/18* (2013.01); *F03D 80/50* (2016.05);
(Continued)

(58) Field of Classification Search
CPC ....... B66C 23/18; B66C 23/207; F03D 80/50; F03D 80/88; Y02E 10/725; Y02E 10/727;
(Continued)

(56) References Cited

U.S. PATENT DOCUMENTS 6,032,094 A * 2/2000 Yanagi .................... E02F 3/325
340/440
6,039,194 A 3/2000 Beeche et al.
(Continued)

FOREIGN PATENT DOCUMENTS

DK 200101691 A 5/2002
EP 1101934 A2 5/2001
(Continued)

OTHER PUBLICATIONS

Danish Patent and Trademark Office, Search Report issued in Application No. PA 2013 70721 dated Jun. 30, 2014.
(Continued)

Primary Examiner — Emmanuel M Marcelo
Assistant Examiner — Juan J Campos, Jr.
(74) Attorney, Agent, or Firm — Wood Herron & Evans LLP (57) ABSTRACT

A nacelle for a wind turbine generator comprises a crane articulated on a base fixed to said nacelle. The crane includes a cantilevered telescopic boom, a principal winch with a lifting line and respective azimuth and elevation drive units for moving said boom in azimuth and in elevation relative to said nacelle. The crane has a deployed condition in which said boom is moveable in azimuth and in elevation and a stowed condition. The nacelle comprises a support structure against which said boom is brought to rest in said stowed condition thereof and wherein when in said stowed condition said boom is located into a predetermined position at which it is held to rest at a point along its length against said
(Continued)

support structure and wherein said lifting line is in a reference position in relation to said nacelle when said crane is in its stowed condition. A method for operating a crane in a nacelle comprising operating said crane as a static hoist using a principal winch of said crane when in said stowed condition of said crane.

16 Claims, 7 Drawing Sheets

(51) Int. Cl.
  *B66C 23/18* (2006.01)
  *F03D 80/50* (2016.01)
  *F03D 1/00* (2006.01)
(52) U.S. Cl.
  CPC ...... *F03D 80/88* (2016.05); *F05B 2220/7064* (2013.01); *F05B 2230/61* (2013.01); *F05B 2240/14* (2013.01); *F05B 2240/916* (2013.01); *Y02E 10/725* (2013.01); *Y02E 10/726* (2013.01); *Y02E 10/728* (2013.01); *Y02P 70/523* (2015.11)
(58) Field of Classification Search
  CPC .............. Y02E 10/728; F05B 2240/916; F05B 2240/14; F05B 2230/61; Y02P 70/523
  See application file for complete search history.

(56) References Cited

U.S. PATENT DOCUMENTS

2010/0021278 A1* 1/2010 Stegemann ............. B66C 23/06
                                                            414/629
2012/0073134 A1* 3/2012 Bywaters ............. H02K 7/1838
                                                            29/889.1

FOREIGN PATENT DOCUMENTS

| | | | |
|---|---|---|---|
| EP | 1284365 A2 | 2/2003 | |
| EP | 1677007 A2 * | 7/2006 | ........... B66C 23/207 |
| EP | 1677007 A2 | 7/2006 | |
| EP | 2147885 A1 | 1/2010 | |
| EP | 2520533 A1 | 11/2012 | |
| EP | 2784018 A1 * | 10/2014 | ........... B66C 23/207 |
| WO | WO-2010031528 A2 * | 3/2010 | ............. B66C 17/06 |
| WO | 2012105971 A1 | 8/2012 | |
| WO | 2012107049 A1 | 8/2012 | |

OTHER PUBLICATIONS

European Patent Office, International Search Report and Written Opinion issued in International Patent Application No. PCT/DK2014/050397 dated Jan. 21, 2015.

* cited by examiner

NACELLE FOR A WIND TURBINE GENERATOR INCLUDING LIFTING APPARATUS

TECHNICAL FIELD

The invention relates to lifting apparatus used in wind turbine generators, particularly nacelles of wind turbine generators.

BACKGROUND

Large, utility-scale horizontal-axis wind turbine generators (HAWTs) typically comprise a set of rotor blades mounted to a supporting structure which usually takes the form of a tubular tower. In such HAWTs, the generating components including the generator, gearbox, drive train and brake assembly are located at the top of a tower in a nacelle behind the hub of the rotor blades.

It is known to install lifting apparatus within a nacelle in order to help personnel install heavy components. For example, WO2012/107049A1 describes a boom crane that is mounted within a nacelle of a HAWT, wherein the boom is movable in elevation and in azimuth in relation to the nacelle. In a stowed position, the boom crane lies inside the nacelle and is covered by a roof. However, the boom crane can be moved to a deployed condition in which the boom is able to reach beyond the roof level to access other parts of the nacelle. For instance, the boom is able to reach a helihoist platform to transfer loads from the platform into the body of the nacelle, but is also able to reach beyond the side of the nacelle to hoist loads from the surface if necessary.

The almost continuous operation of wind turbines generates vibrations. It is believed that these vibrations can lead to dynamic loads such as boom oscillations which may cause wear or which may otherwise adversely affect the long-term reliability of lifting apparatus housed within the nacelle. It is against this background that the invention has been devised.

SUMMARY OF THE INVENTION

Against this background, the invention provides a nacelle for a wind turbine generator comprising a crane. In particular, the crane is articulated on a base fixed to the nacelle, the crane including a cantilevered telescopic boom, a principal winch with a lifting line and respective azimuth and elevation drive units for moving the boom in azimuth and in elevation relative to the nacelle. The crane has a deployed condition in which the boom is moveable in azimuth and in elevation and a stowed condition. According to the invention, the nacelle comprises a support structure against which the boom is brought to rest in said stowed condition thereof. When in its stowed condition, the boom is located into a predetermined position at which it is held to rest at a point along its length against the support structure. The terms held or held to rest or resting against, as used herein, denote a condition such that said support structure inhibits oscillations of said boom during operation of said turbine, i.e. a condition in which the support structure inhibits oscillations of the boom which would otherwise occur during operation of the turbine. Preferably the boom may contact the support structure or be held in close proximity against the support structure. Still preferably, the boom in its stowed condition may exert a minimal pressure against the support structure. According to the invention, the lifting line of the principal winch is brought into a reference position in relation to the nacelle or in relation to particular components of the nacelle when the crane is in its stowed condition.

Beneficially, therefore, the invention provides a lifting apparatus in which the boom is supported against a boom rest and thereby inhibited from oscillation motion of the boom. As mentioned above, wind turbine generators generate significant dynamic loads in use which can influence strongly the cantilevered arrangement of a boom with respect to its base, particularly if frequencies of the vibrations coincide with the natural frequency of the boom crane. This can increase wear on the component parts of the crane where the boom is mounted. Holding the boom of the crane against a fixed support reduces the dynamic loads on the crane when in the stowed condition thereby improving the reliability of the crane.

In principle, the boom may be held against a support at any point along its length which would be such as to inhibit unwanted oscillations of the boom. However, in one configuration the support structure is positioned such that a free end of the boom rests against it, which provides the most effective damping of dynamic loads through the crane.

According to preferred aspects of the invention, the principal winch may be operable to hoist payloads both in a deployed and in a stowed condition of the boom. According to the invention, the lifting line of the principal winch is advantageously placed in a reference position when the crane boom is in a stowed position. The reference position may advantageously lie in a predetermined position in relation to a component or a part of the nacelle. In particular, a predetermined position of the lifting line may lie directly above a component or a part of the nacelle. Advantageously, the reference position of a lifting line of the principal winch may lie above a nacelle aperture or hatch in a floor thereof through which loads may be vertically lifted or lowered between the inside and the outside of the nacelle.

In one embodiment, the crane is configured to be able to hoist payloads when in the stowed condition. In effect, therefore, the crane may be converted to a static hoist when in the stowed condition. One benefit of this is that the crane can be operated when in the stowed condition by personnel who may not otherwise be suitably qualified to operate the crane when in the deployed condition. Optionally, the crane's azimuth and elevation drives may be disabled in a stowed condition thereof while the principal winch may remain enabled for use in said stowed condition. A further benefit from operating the crane in its stowed configuration arises as a result of the crane being in a predetermined position with its lifting line in a known reference position for use. Operation of the crane's principal winch with its lifting line in a reference position removes the need for a skilled or certified crane operator to position the crane for use and ensured that use of the crane in its stowed position is restricted to hoisting operations, i.e. raising and lowering loads, at a given vertical location. In effect, in embodiments, the nacelle crane may be used in its stowed position as a simple hoist in particular for hoisting loads through a hatch in the nacelle floor or for hoisting loads in relation to a particular location or component inside the nacelle.

According to the invention, the boom of the lifting apparatus is movable in azimuth, elevation and telescopic movement when in the deployed condition which provides greatest flexibility of reach for the crane. In embodiments, the relevant crane drives for azimuth and elevation motion of the boom may be disabled when the crane is in a parked mode with the boom in its stowed position. Optionally, the telescoping action of the boom may also be disabled in embodiments of the invention, in particular in a stowed position of the boom.

Optionally, when in the stowed condition, the crane may be located so that its hoist line is at a reference position above or adjacent an opening in a floor of the nacelle located such that that the crane is able to hoist loads up through a tower on which the nacelle is mounted, in use. Alternatively, when in the stowed condition, the crane may be located so that its hoist line is at a reference position above or adjacent an opening in a floor of the nacelle located such that that the crane is able to hoist loads outside of a tower on which the nacelle is mounted, in use.

The support structure does not have to form part of the crane and, as such, may be external to the crane. For example, the support structure for the boom may be provided by an internal frame structure of the nacelle. As an alternative, the support structure may be mounted directly to or between one or more walls of the nacelle. Providing the support structure as part of the internal frame structure of the nacelle provides the most effective route to distribute the loads from the boom into the main tower structure.

In one embodiment the boom may rest from below against a support surface of the support structure but, in an alternative embodiment the boom may rest against a support surface of the support structure from above.

The boom crane may be configured with a rest member to engage against or with the support structure. The rest member may be an integral part of the crane or may be removably attached to it, which allows retrofitting of the rest member to any suitable crane.

In a further optional embodiment, there may be provided a pressure gauge device configured to generate a signal indicative of the pressure applied to the support structure by the boom. The pressure gauge device may in particular be configured to generate an alarm signal if the pressure applied to the support structure by the boom exceeds a predetermined threshold. Accordingly, it can be determined and optionally indicated to an operator, how much load is applied to the support structure. In addition, it can be indicated to an operator by way of an alarm or warning signal, if a load limit on the support structure is reached or exceeded. A load limit may be predetermined and entered into a control system of the nacelle or crane. The provision of a pressure gauge device may thereby prevent overloading of the support structure and/or inappropriate loading of the nacelle. In embodiments, a pressure sensor of the pressure gauge device may be provided at the support structure in particular at a support surface thereof. Alternatively, a pressure sensor of the pressure gauge device may be provided at the rest member.

In one embodiment, the crane is mounted to a housing for a rotating component of the nacelle, such as a low speed shaft including main shaft bearings, gearbox and the like. Such a housing is large and stable and provides a secure mounting point for the crane.

Invention also encompasses a method for operating a crane in a nacelle, the method comprising transitioning the a crane from a deployed operating mode to a stowed operating mode by bringing the crane's boom to rest against a support structure of the nacelle and further by disabling respective elevation and azimuth movement drive of said crane. The method further comprises operating the crane in its stowed mode as a static hoist by using a principal winch of the crane while the boom is in its stowed position. Preferably, the method includes lifting or lowering loads through an aperture in a floor of the nacelle while the boom is in its stowed position and with the crane in its stowed mode of operation. Optionally, advantageously, the method includes measuring the load applied to the support structure, in particular to a support surface thereof and generating a signal if a predetermined load is exceeded. The method may further include inputting into a control system of said crane or nacelle a threshold load level at or above which an alarm signal is generated. The method may further include measuring the load between respective contact surfaces of said crane boom and said support structure. The method may further include measuring the load between respective contact surfaces of said crane boom and said support structure by measuring the load at a contact surface of said crane boom. Alternatively, the method may further include measuring the load between respective contact surfaces of said crane and said support structure by measuring the load at a contact surface of said support structure which may in particular be at support surface thereof.

Additional optional method steps according to aspects of the invention are described throughout this specification. It will be appreciated that preferred and/or optional features of the invention may be combined together or individually with the defined invention.

BRIEF DESCRIPTION OF THE DRAWINGS

In order to provide a more complete understanding of the invention, reference will now be made, by way of example, to the following drawings in which.

DETAILED DESCRIPTION

Figure 1:
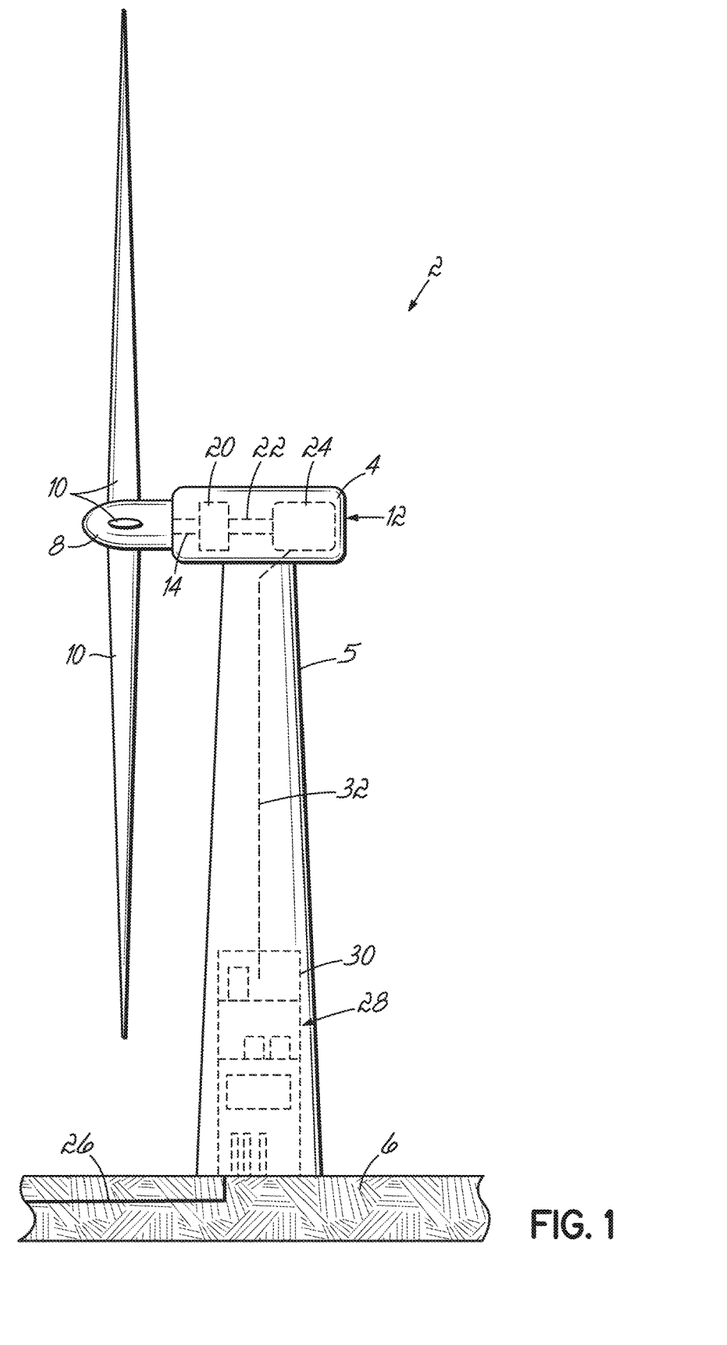
FIG. 1 is a schematic view of a horizontal-axis wind turbine generator.

With reference to FIG. 1, a wind turbine 2 of the horizontal-axis type (HAWT) comprises a nacelle 4 mounted on top of a tower 5 which is itself mounted on a foundation or footing 6. The nacelle 4 includes a hub 8 at its front end which carries a set of rotor blades 10. Three rotor blades 10 are shown in this embodiment, as is common in large utility-scale generators, although the skilled person will appreciated that other numbers of blades are acceptable.

At this point it should be noted that FIG. 1 is for illustrative purposes only, so it is not to scale and is not intended to be a realistic representation of a wind turbine generator. Also it is to be noted that other tower constructions are known, for example towers defined by structural lattice framework.

To enable energy to be recovered from the wind-driven rotating blades 10, the nacelle 4 houses a generator set 12, depicted here in dashed lines, that is driven by the hub 8 through a low speed drive shaft 14. The generator set 12 is typical of a HAWT and includes a gearbox 20 which steps up the rotational speed of the low speed drive shaft 14 at a high speed output shaft 22 which is used to drive an electrical generator 24. The generator 24 outputs alternating current (AC) at a voltage and frequency that is determined largely by the rotational speed of the hub 8 as driven by the rotor blades 10.

To enable variable speed operation of the wind turbine generator 2, the alternating current output by the generator 24 is first converted, or 'rectified', to direct current (DC) and is then converted back into alternating current (or 'inverted') at the correct frequency and voltage in order to integrate with the frequency and voltage that is required from the national grid system via supply line 26. The process of rectification and inversion is handled by a power system 28 that is contained in an internal tower structure 30 to which the generator 24 is electrically connected by way of a high voltage AC current line 32.

The need for routine maintenance of the generator set 12 or the need to fix or replace components of the generator set 12 requires that personnel have access to the interior of the nacelle 4. This can be achieved by providing a suitable ladder system within the tower so that personnel can climb to the top of the tower. Alternative access options are for personnel to be flown to the wind turbine generator by helicopter and winched onto the nacelle, or for personnel to be conveyed to the nacelle by a 'cherry picker platform' provided by a ground-based crane. However, although personnel can gain access to the nacelle in this way, it is much more challenging for heavy pieces of equipment, for example drive shafts or gearbox components, to be transported to the nacelle in the same manner.

It is against this context that the invention will now be described with reference to FIGS. 2 to 8 which show a nacelle 4 having an integrated lifting apparatus 40 that addresses the problems explained above.

Figure 6:
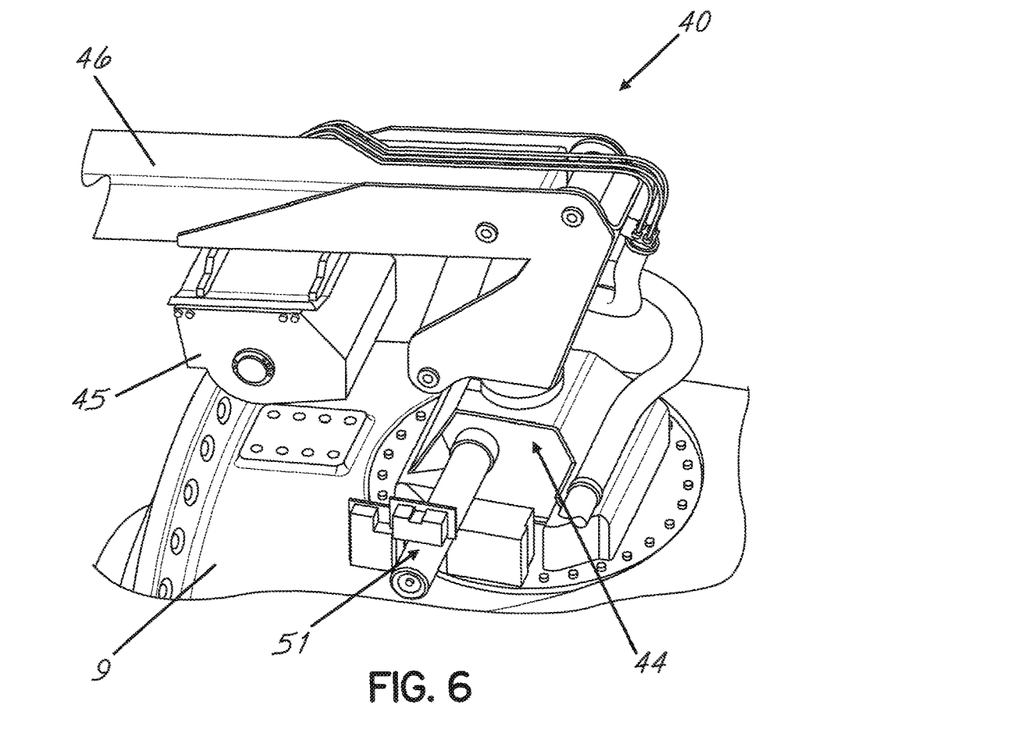
FIGS. 6 and 7 are perspective views, from alternate viewing angles, that illustrate how the lifting apparatus is mounted to the nacelle.
Figure 7:
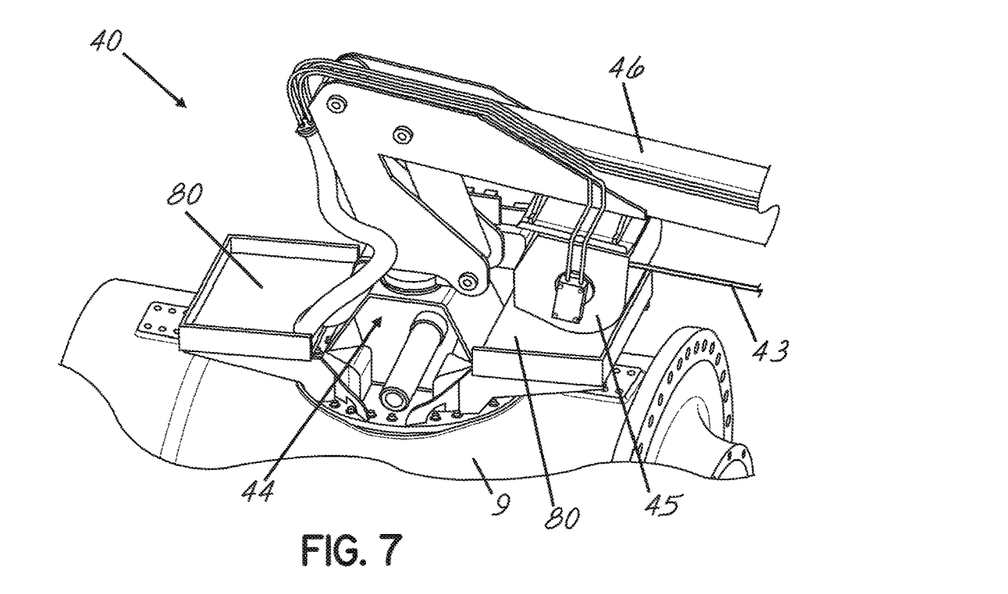
Figure 8:
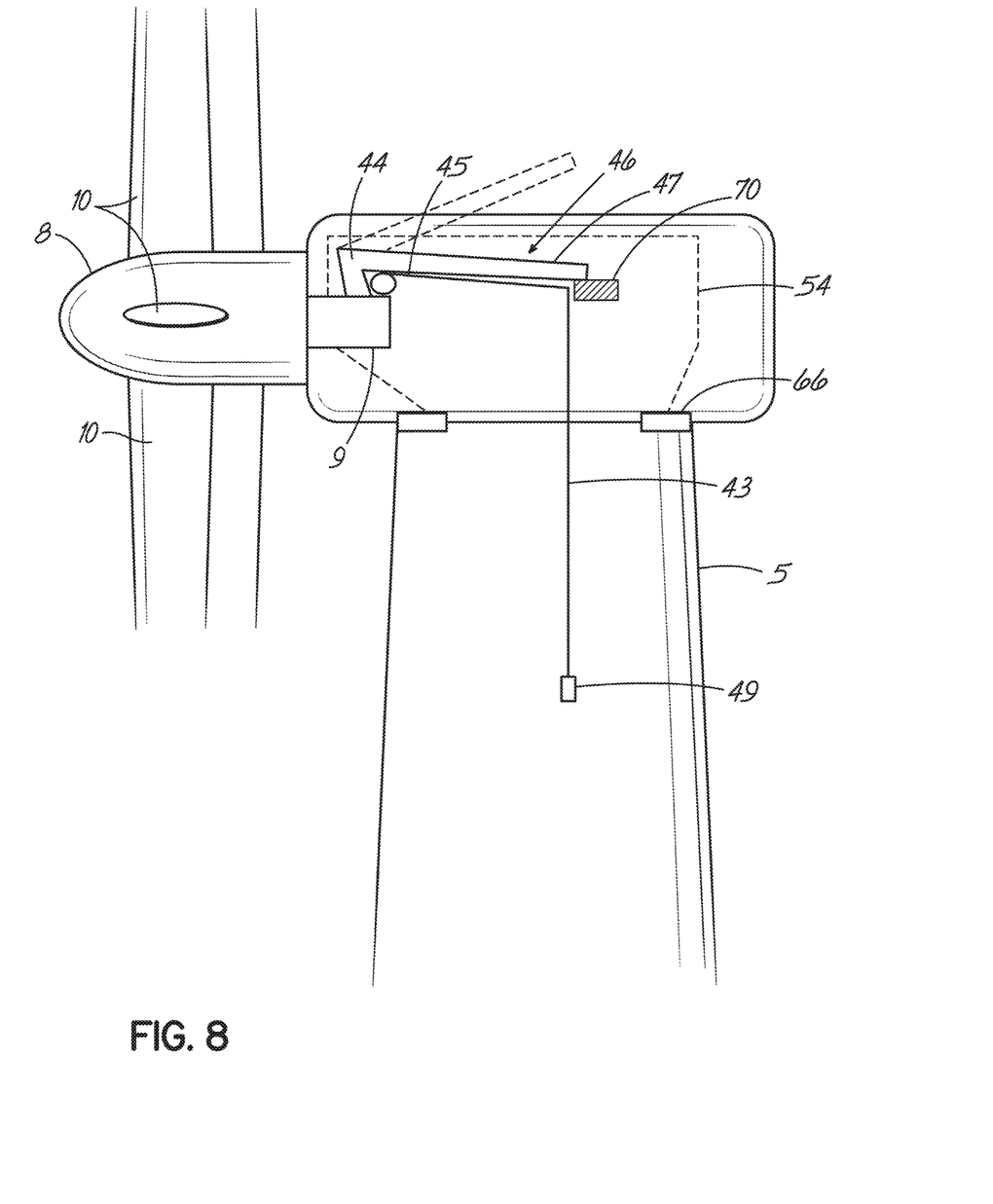
FIG. 8 is a schematic view of the nacelle illustrating the lifting apparatus operating in the stowed mode and FIG. 9 is a schematic view similar to FIG. 8 but which shows an alternative configuration of nacelle and its associated crane.

The lifting apparatus 40 includes a crane 42 that is mounted to the nacelle 4. In this embodiment, the crane 42 is a telescopic boom crane comprising a crane base 44 fixed to the nacelle and a movable boom 46 that is articulated on and cantilevered from the base 44. A powered principal winch 45 is provided at a base region of the crane 42 in particular at a base end of the boom 46 that spools out a principal lifting line 43 e.g. in the form of a steel cable that is routed through a suspension point at a free end 47 of the boom 46 to terminate in a lifting attachment, such as a hook 49. The crane 42 also includes a power system, shown here generally by the reference numeral '51', which is configured to drive the telescopic, elevation and slewing (i.e. azimuth) operations of the boom 46 relative to the base 44. The power system may in particular be an electrohydraulic power system. Such a boom crane would be familiar to the skilled person. Although the crane 42 could be mounted to the nacelle 4 in various ways, here the base 44 of the crane 42 is mounted to a shaft housing 9 of the nacelle 4, as shown in FIGS. 6, 7 and 8. Note that the shaft housing 9 provides bearing support for drive train components such as the generator and particularly the low speed shaft.

The crane 42 is configured to be placed in two conditions, or modes: i) a first 'stowed' condition in which the boom 46 is housed within the nacelle 4 and ii) a second 'deployed' condition in which the boom 46 is movable with respect to the base 44 of the crane 42.

Figure 3:
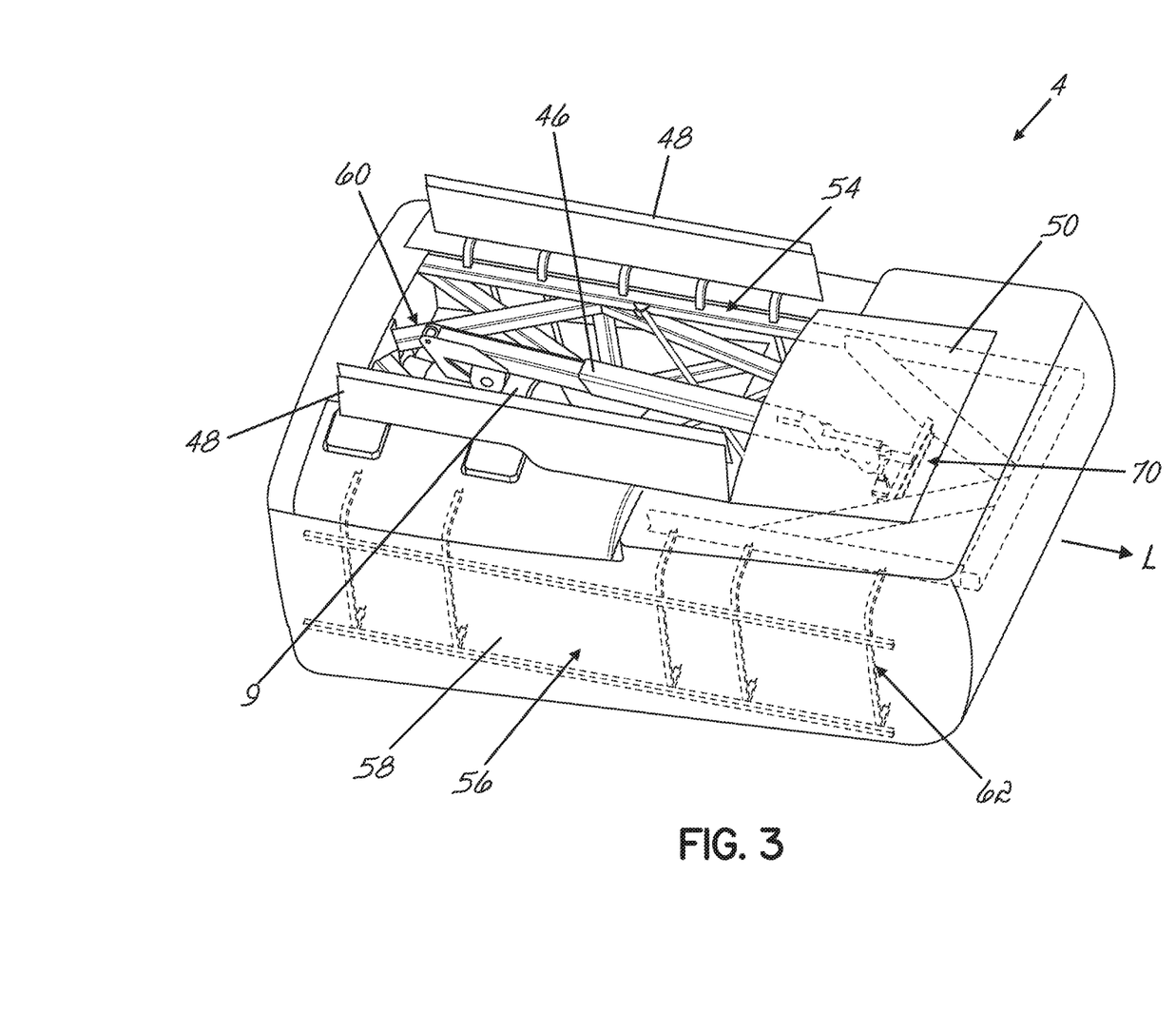
FIG. 3 is a perspective view of part of the nacelle in FIG. 2, but from a different viewing angle, and which shows the lifting apparatus in a 'stowed' condition.
Figure 4:
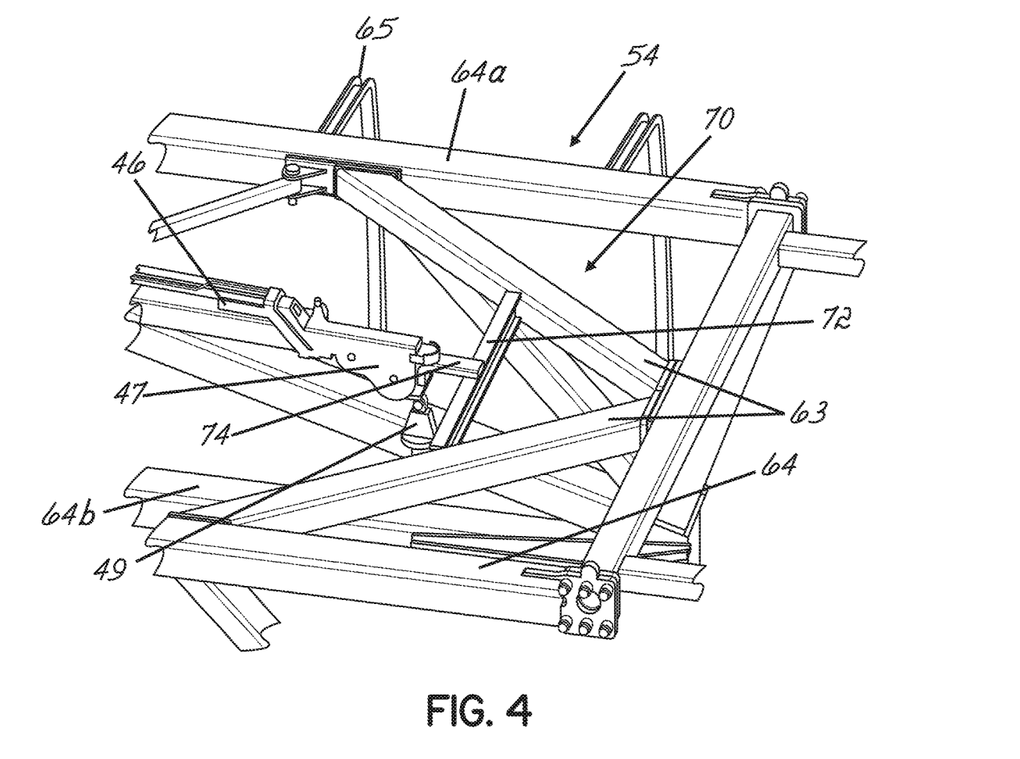
FIG. 4 is a more detailed view of a structural framework of the nacelle in FIG. 3 which shows a support structure for the lifting apparatus.
Figure 5:
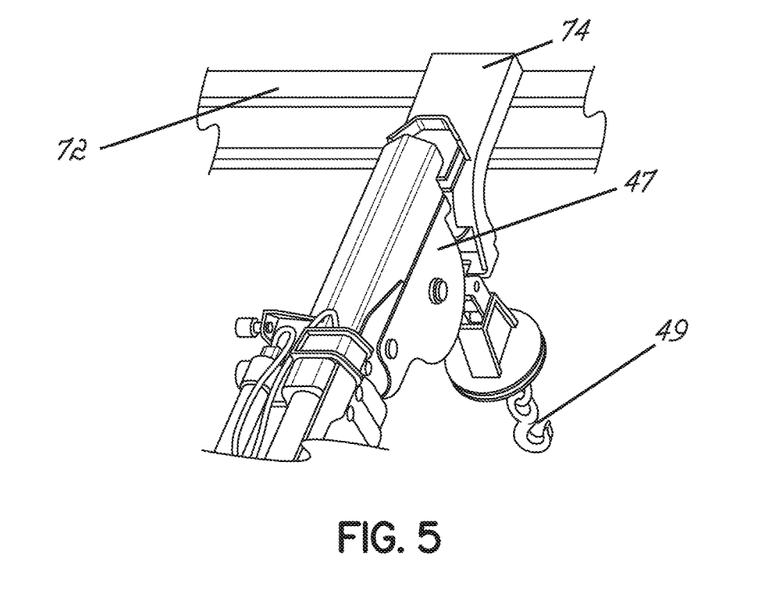
FIG. 5 is an enlarged view of a region of FIG. 4.

As shown perhaps most clearly in FIG. 3, with the base 44 of the crane 42 mounted to the hub bearing 9, the boom may 46 extend generally along a centreline of the nacelle 4 when placed in the stowed condition.

Figure 2:
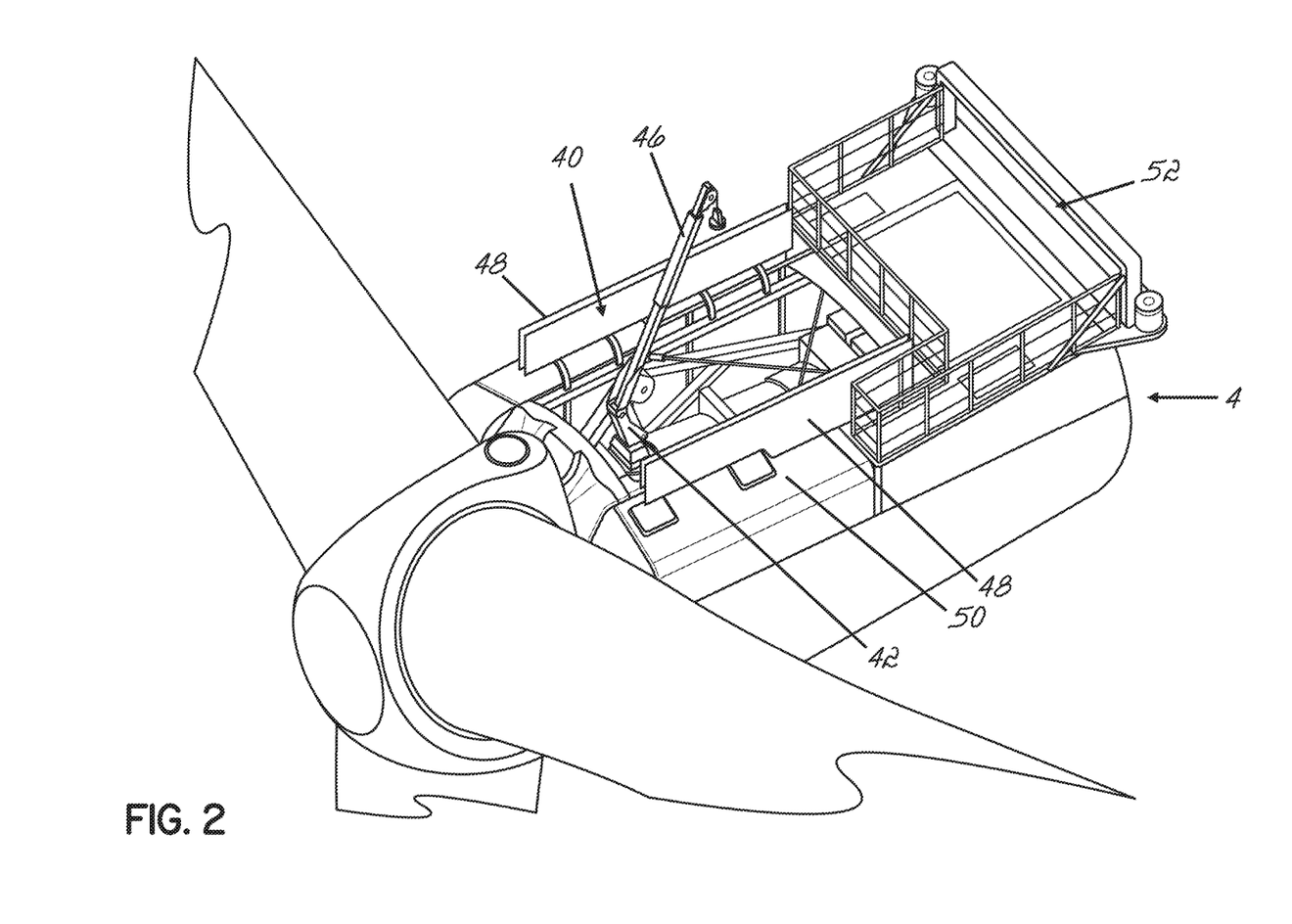
FIG. 2 is a perspective view of a nacelle of a wind turbine generator that incorporates a lifting apparatus.

However, when placed in the deployed condition, the boom 46 is operable to extend out from the confines of the nacelle 4 so as to reach above a set of closable doors 48 that define a roof of the nacelle 4 when they are closed. FIGS. 2 and 8 illustrate this particularly clearly in which the boom 46 extends beyond an upper deck 50 of the nacelle 42. In this mode, therefore, the boom 46 may be swung out beyond the side of the nacelle so that it is able to hoist payloads from ground level up to the nacelle 4. The boom 46 may also be extended telescopically so that it is able to reach a maintenance platform that is shown here as mounted to the rear of the upper deck of the nacelle 4, and it is also able to reach the hub 8 and through a rear maintenance hatch (not shown) of the nacelle 4.

Having described the overall operation of the crane 42 in general terms, discussion will now turn to the more detailed construction of the nacelle 4.

The nacelle 4 comprises an internal frame structure 54 that supports an outer skin 56. The outer skin 56 defines the upper deck 50 and side walls 58 of the nacelle 4 and may be formed from any suitable material as is known in the art. Typically, however, the outer skin 56 will be in the form of metal panels, for example steel or aluminium, or, alternatively of a composite construction, for example GRP (glass-fibre reinforced plastic).

The internal frame structure 54 includes a main frame 60 and an outer sub-frame 62. The main frame 60 provides the nacelle 4 with structural strength whilst the sub-frame 62 carries the outer skin 56.

The main frame 60 comprises a triangulated network of frame members 64 (only some of which are labelled) which is connected to a yaw deck 66 of the tower 5, as illustrated schematically in FIG. 8. Such a configuration is generally known in the art.

The functional components of the nacelle 4 are mounted to the main frame, for example, the main hub bearing 9, the gear box, the generating equipment and the like, although it should be appreciated that many of these components are not shown in the figures for clarity. However, the main hub bearing 9 is shown in FIG. 3, positioned to the left hand side of the nacelle 4.

The sub-frame 62 comprises a plurality of vertical members 65 or 'stringers' that are generally C-shaped in form and are connected between upper and lower horizontal rails 64a, 64b of the main frame 60 to provide a rib-type structure for supporting the outer skin 56.

As can be seen in FIG. 3, the crane 42 is fixedly mounted to the main hub bearing 9 such that the boom 46 extends in the longitudinal direction 'L' of the nacelle 4 and is surrounded by the main frame 60, when the crane 42 is in the stowed or 'parked' condition. In this condition, the crane 42 is configured so that the boom 46 is supported held against a support structure 70. More specifically, and with particular reference to FIGS. 4 and 5, the support structure 70 in this embodiment is 'I-beam' type support member or 'bracket' which extends between first and second frame members 63 that flank the bracket and extend obliquely to it. In the embodiment illustrated in FIG. 3, the support structure 70 exhibits a support surface 72 on a top face thereof although in embodiments of the invention, the support surface may be at a bottom face thereof. The arrangement of the boom 46 resting against the support structure 70 is primarily intended to prevent oscillations of the boom 46 during operation of the turbine which oscillations may arise as a result of vibrations of the turbine's operational elements during operation. Hence, in a stowed position of the boom 46 as illustrated, the loads generated by the boom's own weight are carried by the crane 42. Moreover, a pressure gauge may be provided having in particular a pressure sensor which may be arranged between the boom 46 and the support structure 70. The pressure gauge may be configured to output a signal indicating the amount of load applied to the support structure 70 by the boom 46. In embodiments, the pressure gauge may be configured to emit a signal which may be an alarm signal at a predetermined load threshold defined in the pressure gauge. This may serve to prevent excessive force being applied to the support structure 70 when the boom 46 is brought to rest against it or at any time while the boom 46 is resting against the support structure 46. It may thereby be prevented that inappropriate load is applied to the support structure 70 by the boom 46. This aspect also prevents undue stresses being applied the nacelle 4 by the action or use of the lifting apparatus 40 or crane 42. A pressure sensor may be placed for example at a support surface 72 or at a contact surface of the boom 46.

Although it is feasible that a support structure 70 could be provided to support the boom 46 at any point along its length, in this embodiment free end 47 of the boom 46 has a contact surface which rests against the support member 72. More specifically, the free end 47 of the boom 46 includes a rest in the form of extension member 74 embodied as an L-shaped flange that is bolted or otherwise removably attached to the free end 47 of the boom 46. The flange 74 rests the boom 46 against the support member 72. The support member 72 therefore lightly contacts the boom 46 and this holds the boom 46 in position and against oscillations when in the stowed condition. During operation of the wind turbine, the crane 42 is subject to significant dynamic loading that may be transmitted to the crane 42 through its base 44 fixed to the nacelle 4 and this can have a detrimental effect on the long-term reliability of the crane 42. Thus, a benefit of the support structure 70 is that it provides support to the boom 46 when it is in the stowed condition, thereby reducing the loading on the crane 42 during operation of the wind turbine. Reliability of the crane 42 is improved and wear may be reduced.

In a further feature of the lifting apparatus 40, the crane 42 is configured such that the power system 51 of the crane 42 is disabled when it is placed in the stowed condition. The crane functions which enable the boom 46 to be elevated and slewed in azimuth, are thus unavailable to an operator in the stowed condition. Optionally, the crane may be configured such that also the telescopically extending and retracting function of the crane 42 is disabled when the boom 46 is in the stowed condition. However, in the stowed condition, the crane 42 may preferably be configured so that the principal winch 45 is still operational to the extent that it is able to lift payloads with the boom 46 in a static position. In effect, therefore, the boom crane 2 is converted into a static hoist.

In this illustrated embodiment, the stowed condition the free end 47 of the boom 46 is shown located in a predetermined position with the lifting line 43 suspended vertically in a reference position above the yaw deck 66 of the nacelle 4. The yaw deck may define an aperture and may comprise a hatch (not shown). The crane 42 therefore is operable in its stowed configuration so that the hoisting line 43 is able to pass through the yaw deck 66 into the interior of the tower which permits payloads to be lowered from the nacelle 4 into the tower or raised into the nacelle 4 from the interior of the tower 5. In effect, therefore, in the stowed condition the crane 42 is converted into a simple hoist without the facility for the boom 46 to be slewed, elevated or telescoped. This enables the crane 42 to be operated by personnel without a suitable qualification which gives greater flexibility for maintaining the wind turbine. When used as a static hoist, as described, loads placed on the boom 46 by the payloads carried on the lifting line 43 are borne by the crane 42 through its base 44 or at least chiefly by the crane 42. In embodiments, a pressure gauge may emit a signal if the load applied by the boom 46 on the support structure 70 exceeds a predetermined limit.

FIG. 7 illustrates an additional component of the lifting apparatus 40 that is not shown in the corresponding view of the lifting apparatus 40 in FIG. 6. As shown here, the crane base 44 is provided with first and second horizontally-mounted platforms 80 that are mounted either side of the base 44. The platforms 80 allow maintenance personnel to access the crane components for inspection and maintenance purposes.

Some variations to the specific embodiment of the invention described with reference to FIGS. 2 to 8 have already been mentioned above. Others will now be explained.

Figure 9:
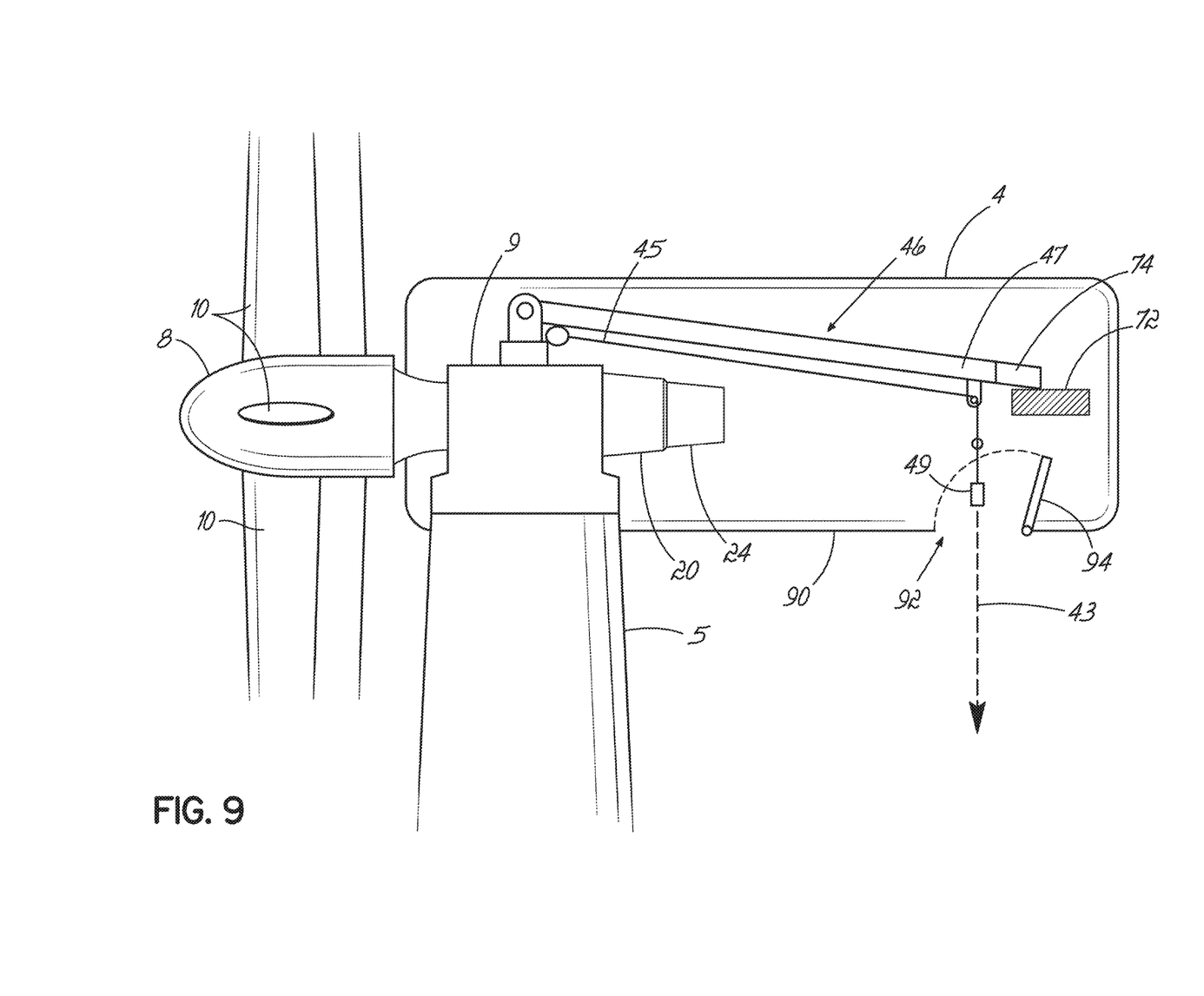

In the embodiments described above the crane is configured so that in a deployed condition the boom 46 is operable to extend in elevation, slew and extension or retraction. The free end 47 of the boom 46 may in particular extend from the confines of the nacelle 4 whereas, in a stowed condition, the free end 47 of the boom is positioned in a predetermined position with its free end and principal lifting line in a reference position e.g. over the yaw deck 66 of the nacelle 4. The lifting line 43 may thereby be extendable down inside the interior of the tower 5. However, in a further configuration, the reference position of lifting line 43 may be above an aperture allowing the lifting line 43 to extend down the outside of the tower—this is illustrated in FIG. 9. In this Figure, the same reference numerals are used to refer to components in common with the previous embodiments. As can be seen in this embodiment the nacelle 4 extends rearward from the tower 5 to define a significant overhang. The floor 90 of the overhang defines an aperture in the form of hatch 92. The hatch 92 may be open permanently or may have a means to close it, such as a pivoted door 94 as shown here.

The crane is configured so that the free end 47 of the boom 46 is positioned over the hatch 92 when the boom 46 is in the stowed or parked position resting against a support surface 72 of the support structure 70. The hook 49 at the end of the lifting line 43 is therefore able to be extended down through the hatch 92 to lower items to the ground or to lift items to the nacelle 4 from the ground.

The embodiment of FIGS. 2 to 8 could also be configured in a similar manner so that a suitable hatch is provided in location that is reachable by the crane, for example in a rear wall of the nacelle, so that items may be lifted and lowered outside of the tower 5.

It should be noted that in all of the embodiments it has been described that the flange 74 is removably attached to the free end 47 of the boom 46, for example by bolts, it should be noted that this is not essential and that instead the flange 74 could be formed as an integral part of the boom. For example, the flange 74 could be welded to the free end 47 of the boom 46, or the boom 46 could be shaped specifically to define the flange 74. However, attaching the flange 47 to the boom 46 in a removable manner enables an 'off the shelf' crane to be selected and retrofitted with such a flange 74. This enables different cranes to be selected and retrofitted as needed. In embodiments, a pressure sensor of a pressure gauge may be included in a contact surface of flange 74

In the above discussion, the boom 46 of the crane 42 rests against a support structure 70 that is embodied by a part of the internal frame structure 54 of the nacelle 4. However, it should be appreciated that other configurations are possible to support the boom 46 of the crane 42. For example, a suitable support bracket could be arranged to extend directly between opposed side walls 58 of the nacelle 4, or to extend upwards from the nacelle floor (not shown). A further alternative is for a suitable structure to be integrated into the base 44 of the crane 42 which reaches forward to support the boom 46 at some point along its length, preferably at its free end. Also, although in the embodiments described above the boom is supported from below, it is also possible for a supporting structure to be configured to provide support to the boom from above.

Furthermore, although it has been described that the free end 47 of the boom 46 is supported, it should be appreciated that in principle any part of the boom 46 may be supported. Since the boom crane is, in essence, a cantilever structure, supporting the free end of the boom provide the most effective reduction in stress on the base 44 of the crane 42. However, supports at other points along the length of the boom 46 would also provide an advantage.

The crane 42 has been described as a telescopic boom crane. Such a crane is useful since it has three degrees of freedom (slew, elevate and telescope) and so opens up access to many areas of the nacelle.

Although the lifting apparatus has been described in the context of being installed in a nacelle of a wind turbine generator, it may also be installed in other locations, for example within a tower structure of the wind turbine generator.

The invention claimed is:

1. A nacelle for a wind turbine generator comprising a crane articulated on a base fixed to said nacelle, said crane including a cantilevered telescopic boom, a principal winch with a lifting line and respective azimuth and elevation drive units for moving said boom in azimuth and in elevation relative to said nacelle, said crane having a deployed condition in which said boom is moveable in azimuth and in elevation and a stowed condition, wherein said nacelle comprises a support structure against which said boom is brought to rest in said stowed condition thereof and wherein when in said stowed condition said boom is located into a predetermined position at which said boom is held to rest at a point along a length of said boom against said support structure and wherein said lifting line is in a reference position in relation to said nacelle when said crane is in said stowed condition.

2. The nacelle of claim 1, wherein when in said reference position, said lifting line is located above an opening in said nacelle.

3. The nacelle of claim 2, wherein said lifting line of said principal winch is operable to hoist payloads both in said deployed condition of said boom, and also in said stowed condition so that said crane is able to hoist payloads outside of a tower on which said nacelle is mounted.

4. The nacelle of claim 2, wherein said lifting line of said principal winch is operable to hoist payloads both in said deployed condition of said boom, and also in said stowed condition so that said crane is able to hoist payloads up through a tower on which said nacelle is mounted.

5. The nacelle of claim 1, wherein said boom includes a rest member that is held by said support structure when said crane is in said stowed condition.

6. The nacelle of claim 5, wherein said rest member is removable from said boom.

7. The nacelle of claim 1, wherein a pressure gauge device is configured to generate a signal indicative of the pressure applied to said support structure by said boom.

8. The nacelle of claim 7, wherein said pressure gauge device is configured to generate an alarm signal if said pressure applied to said support structure by said boom exceeds a predetermined threshold.

9. The nacelle of claim 1, wherein a free end of said boom rests against said support structure in said stowed position of said crane.

10. The nacelle of claim 1, wherein the crane includes a maintenance platform upon which personnel may stand to access components of the crane.

11. The nacelle of claim 1, wherein said support structure is integral to an internal framework of the nacelle.

12. The nacelle of claim 1, wherein said support structure is mounted directly to or between one or more walls of said nacelle.

13. The nacelle of claim 1, wherein said crane is mounted to a housing for a rotating component of said nacelle.

14. A method for operating a crane in a nacelle according to claim 1 said method comprising placing said crane from said deployed condition to said stowed condition by bringing said boom of said crane to rest against said support structure and disabling respective elevation and azimuth movement drive of said crane, said method further comprising operating said crane as a static hoist using said principal winch in said stowed condition.

15. The method according to claim 14, further including determining the load applied to said support structure by said boom and generating a signal when said load exceeds a predetermined threshold.

16. The method according to claim 14, further comprising placing said crane from said stowed condition to said deployed condition and operating said crane using said principal winch in said deployed condition.

* * * * *